J. R. McCORMICK.
COTTON-CHOPPER.
No. 184,406. Patented Nov. 14, 1876.
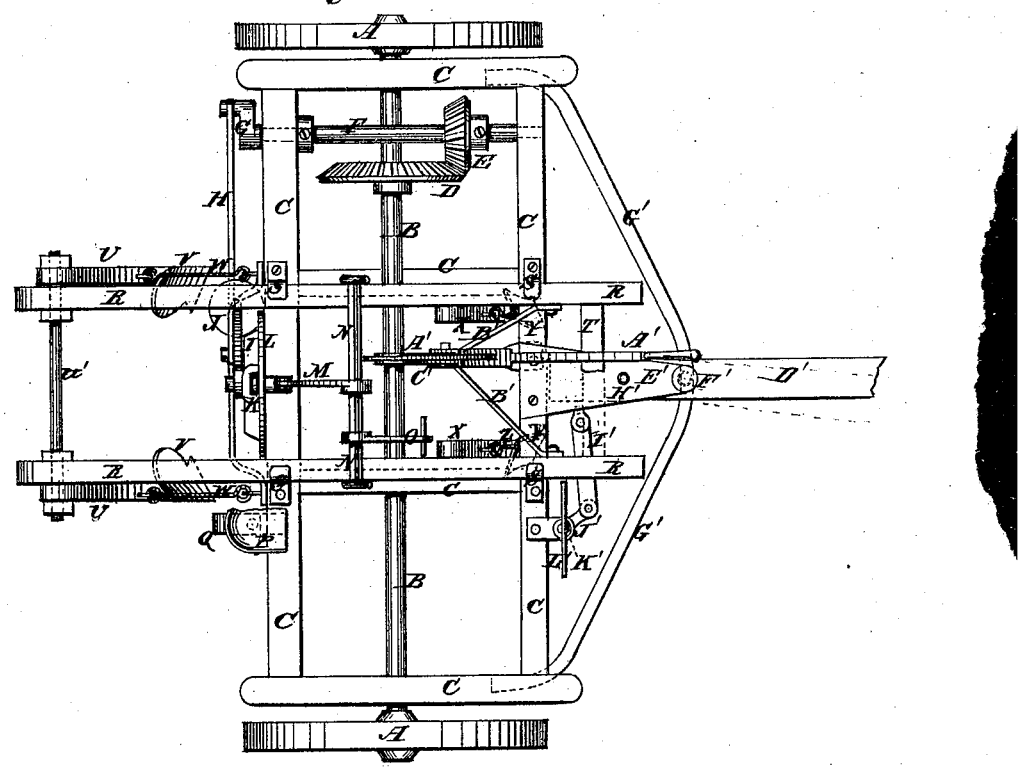
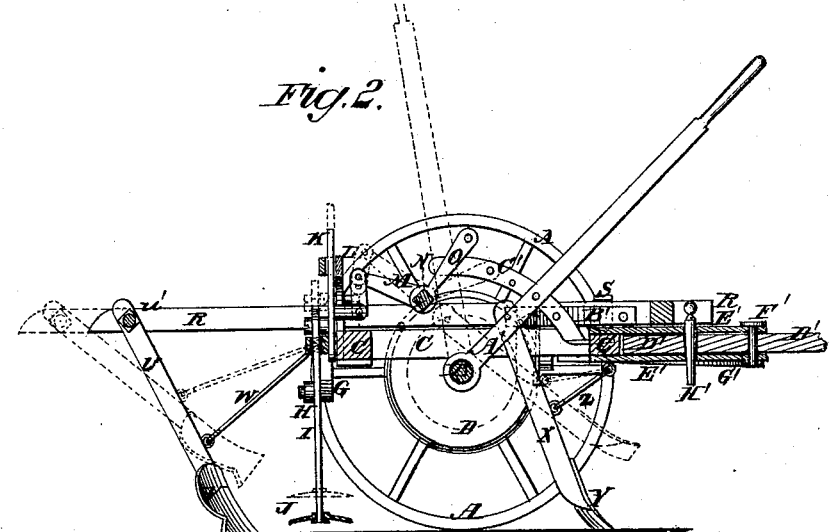
WITNESSES:
Francis McArdle.
John Goethals
INVENTOR:
J. R. McCormick
BY
[signature]
ATTORNEYS.

UNITED STATES PATENT OFFICE.

JOHN R. McCORMICK, OF GEORGETOWN, TEXAS.

IMPROVEMENT IN COTTON-CHOPPERS.

Specification forming part of Letters Patent No. 184,406, dated November 14, 1876; application filed July 31, 1876.

*To all whom it may concern:*

Be it known that I, JOHN R. McCORMICK, of Georgetown, in the county of Williamson and State of Texas, have invented a new and Improved Combined Scraper, Chopper, and Cultivator, of which the following is a specification:

Figure 1 is a top view of my improved machine. Fig. 2 is a vertical section of the same.

The object of this invention is to furnish an improved machine for scraping, chopping, and cultivating corn and cotton, which shall be simple in construction and convenient in use, being easily guided and controlled, and readily adjusted for chopping or cultivating, or both.

The invention will first be described in connection with the drawing, and then pointed out in the claims.

A are the wheels, which are attached to the ends of the axle B. The axle B revolves in bearings attached to the frame C. To the axle B, near one end, is attached a large bevel-gear wheel, D, the teeth of which mesh into the teeth of the smaller bevel-gear wheel E attached to the shaft F. The shaft F revolves in bearings attached to the front and rear bars of the frame C. To the rear end of the shaft F is pivoted a short crank, G, to which is pivoted the outer end of the connecting-rod H. The inner end of the connecting-rod H is pivoted to the bar or standard I, to the lower end of which is pivoted a circular chopper, J. Said chopper is thus adapted to rotate, and will hence work in clayey or sticky soils without becoming choked or clogged like the ordinary stationary chopper. The upper end of the chopper-standard I is pivoted to the bar K or other support, several holes being formed in the standard to receive the said pivot, so that the chopper J may be adjusted to mark higher or lower, as may be desired. The bar K slides up and down in keepers attached to the rear cross-bar of the frame C, and to an arched bar, L, attached to said cross-bar. With the sliding bar K is connected, by a link or other jointed connection, the end of a crank-bar, M, attached to the shaft N, the ends of which work in bearings or studs attached to the frame C. To the shaft N is also attached a crank-arm or lever, O, which is so formed and is so placed that it may be operated by the driver with his feet while sitting upon his seat P, the standard Q of which is attached to the frame C. By this construction, by operating the crank-arm O, the chopper J can be raised from the ground. R are the plow-beams, which rest and slide upon the frame C, and are kept in place by keepers S attached to said frame. The forward ends of the beams R are connected by a cross-bar, T, and their rear ends are connected by the long bolt u' that pivots the rear plow-standards U to said beams. To the lower ends of the standards U are attached plows V, for throwing soil around the plants, and which may be exchanged to throw the soil from said plants, if desired. The draft-strain upon the standard U is sustained by the brace-rods W, the front ends of which are pivoted to the frame C. To the forward parts of the beams R are pivoted the upper ends of the standards X, to the lower ends of which are attached the scrapers Y. The draft-strain upon the standards X is sustained by the braces Z, the lower ends of which are pivoted to the lower parts of the standards X, and their upper ends are pivoted to the frame C. A' is a lever, the lower end of which rides upon and is pivoted to the axle B. To the lever A' are pivoted the rear ends of two bars, B', the forward ends of which are pivoted to the forward parts of the beams R, so that by operating the lever A', the beams R may be moved back to raise the plows V Y from the ground, or moved forward to lower them to the ground. The lever A' moves along an arched bar, C', attached to the frame C, and is locked in any position into which it may be adjusted by a pin that passes through it, and through one or the other of the holes through the arched bar C. D' is the tongue, which is pivoted to and between the forward ends of two arms, E', attached to the upper and lower side of the center of the front cross-bar of the frame C by a bolt, F', and which are strengthened against side strain by the braces G' attached to the end of the lower arm and to the corners of the frame C. The tongue D may be made rigid by a second pin, H', dropped through a hole in the arms E' and the said tongue D'. To the side of the rear end of the tongue D' is pivoted the end of a rod, I', the other end of which is pivoted to the crank J' attached to the lower end of the shaft K'. The shaft K' works in bearings attached to the front bar of the frame C, and to its upper end is attached a cross-head or equal-armed lever, L', so that the driver by pushing upon the lever L' with his feet, can readily guide the machine.

Having thus described my invention, what I claim as new, and desire to secure by Letters Patent, is—

1. The chopper-blade J, pivoted and revolving upon the vertical arm I, as shown and described.

2. The combination of the vibrating chopper I J, vertical bar K sliding in sockets, arm M, rack-shaft N, and foot-lever O, substantially as shown and described.

3. The combination of the sliding-beams R, and the stationary pivoted braces W Z, with the frame C and the plow-standards U X, substantially as herein shown and described.

JOHN ROBERT McCORMICK.

Witnesses:
R. H. MONTGOMERY,
W. M. KEY.